US008448780B2

(12) United States Patent
Gotoh et al.

(10) Patent No.: US 8,448,780 B2
(45) Date of Patent: May 28, 2013

(54) SHEET BUNDLE CONVEYING APPARATUS AND PAPER SHEET HANDLING APPARATUS

(75) Inventors: Yasushi Gotoh, Inagi (JP); Mitsushige Nakao, Inagi (JP)

(73) Assignees: Fujitsu Limited, Kawasaki (JP); NCR International Inc., Duluth, GA (US)

( * ) Notice: Subject to any disclaimer, the term of this patent is extended or adjusted under 35 U.S.C. 154(b) by 33 days.

(21) Appl. No.: 13/336,166

(22) Filed: Dec. 23, 2011

(65) Prior Publication Data

US 2012/0132505 A1 May 31, 2012

Related U.S. Application Data

(63) Continuation of application No. PCT/JP2009/002997, filed on Jun. 29, 2009.

(51) Int. Cl.
*B65G 19/00* (2006.01)

(52) U.S. Cl.
USPC .......................................................... 198/717

(58) Field of Classification Search
USPC ....... 198/717, 736, 747, 748, 749; 414/790.3, 414/768.8
See application file for complete search history.

(56) References Cited

U.S. PATENT DOCUMENTS

| | | | | | |
|---|---|---|---|---|---|
| 3,375,939 | A | * | 4/1968 | Barley | 414/19 |
| 3,790,004 | A | * | 2/1974 | Tole et al. | 414/790.3 |
| 3,892,168 | A | * | 7/1975 | Grobman | 414/789.1 |
| 4,784,559 | A | * | 11/1988 | Kwasnitza | 414/796 |
| 5,205,703 | A | * | 4/1993 | Shill et al. | 414/796 |
| 5,342,165 | A | * | 8/1994 | Graef et al. | 414/788.9 |
| 2007/0007712 | A1 | | 1/2007 | Gotoh et al. | |

FOREIGN PATENT DOCUMENTS

| | | |
|---|---|---|
| EP | 1 726 546 | 10/2008 |
| JP | 7-965 | 1/1995 |
| JP | 07-172710 | 7/1995 |
| JP | 09-151009 | 6/1997 |
| JP | 2005-255407 | 9/2005 |

* cited by examiner

*Primary Examiner* — Gene Crawford
*Assistant Examiner* — William R Harp
(74) *Attorney, Agent, or Firm* — Staas & Halsey LLP

(57) ABSTRACT

In a system, a carrier includes one or more contact members that come into contact with a paper sheet bundle in which one or more paper sheets are stacked, to push the paper sheet bundle, and the paper sheet bundle is conveyed by the carrier along a conveying path. Suppressing unit that suppresses the paper sheet constituting the paper sheet bundle from passing through a gap existing between a constituent member and the contact members to enter on an inner side of the carrier, the constituent member forming a space of the conveying path, the paper sheet bundle pushed by the carrier coming into contact with the constituent member.

5 Claims, 8 Drawing Sheets

SHEET BUNDLE CONVEYING APPARATUS AND PAPER SHEET HANDLING APPARATUS

CROSS-REFERENCE TO RELATED APPLICATION

This is a continuation application of International Application No. PCT/JP2009/002997 filed on Jun. 29, 2009, the entire contents of which are incorporated herein by reference.

FIELD

The present invention relates to a technique of conveying a paper sheet bundle in which one or more paper sheets are separably stacked, in a direction crossing the stacking direction of the paper sheets along a conveying path.

BACKGROUND

Paper sheet handling apparatuses that handle paper sheets are widely prevalent in the society. For example, paper sheet handling apparatuses that handle paper currencies as the paper sheets are widely prevalent as automated machine such as cash processors used in teller operations, automatic depositors (AD), or automatic teller machines (ATM).

A large part of the paper sheet handling apparatuses are configured to convey the paper sheets one by one. In recent years, some paper sheet handling apparatuses with a sheet bundle conveying apparatus mounted thereon have been put into commercial reality, the sheet bundle conveying apparatus conveying a paper sheet bundle in which one or more paper sheets are separably stacked, in a direction crossing the stacking direction of the paper sheets. A conventional sheet bundle conveying apparatus (paper sheet handling apparatus) is described in, for example, Patent Document 1. In the conventional sheet bundle conveying apparatus described in Patent Document 1, a carrier including a plurality of contact members (plates) for coming into contact with a paper sheet bundle to push the paper sheet bundle is moved on a conveying path, whereby the paper sheet bundle is conveyed.

FIG. 1 is a view for describing the conventional sheet bundle conveying apparatus described in Patent Document 1. In FIG. 1, a carrier 10 is illustrated from the side of a paper sheet bundle P to be conveyed. 20 denotes the conveying path, and the conveying path 20 is defined by a space formed between an upper wall 21 and a lower wall 22.

In a configuration of the carrier 10, five push-out plates 12 are attached to a plate-like member 11 produced by bending a metal plate. With this configuration, when the carrier 10 is moved in a direction toward the paper sheet bundle P, the paper sheet bundle P is conveyed while being pushed by the push-out plates 12.

A standing piece 12*a* protruding downward is provided to a lower portion of each push-out plate 12, that is, a lower wall 22 side thereof. Similarly, a standing piece 12*b* protruding upward is provided to an upper portion of each push-out plate 12, that is, an upper wall 21 side thereof. Accordingly, a groove 22*a* having a shape for housing each standing piece 12*a* is formed on a conveying path 20 side surface of the lower wall 22, and similarly, a groove 21*a* having a shape for housing each standing piece 12*b* is formed on a conveying path 20 side surface of the upper wall 21.

The push-out plates 12 each need to avoid contact with the lower wall 22 and the upper wall 21. The paper sheet bundle P between the lower wall 22 and the upper wall 21 is conveyed with a bottom thereof being in contact with the lower wall 22. Depending on the number of paper sheets in the paper sheet bundle P, a state of each paper sheet, and the like, the topmost paper sheet may come into contact with the upper wall 21. This is because, if the number of paper sheets is large, the total thickness (hereinafter, the "thickness" is used to refer to the width in the stacking direction of the paper sheets in the stacking direction of the paper sheets, unless otherwise defined) is large, and even if the number of paper sheets is small, if a folded paper sheet exists, the total thickness may be increased by the folded paper sheet. For this reason, the standing piece 12*a* and the groove 22*a*, and the standing piece 12*b* and the groove 21*a* are provided in order to prevent the paper sheets from entering a gap between each push-out plate 12 and the lower wall 22 and a gap between each push-out plate 12 and the upper wall 21. In FIG. 1, L1 denotes the gap between each push-out plate 12 and the lower wall 22, and L4 denotes the gap between the push-out plate 12 and the upper wall 21.

The paper sheets in the paper sheet bundle P to be conveyed by the carrier 10 are not necessarily appropriately stacked. Some of the paper sheets may have a sticking-out portion in some cases. If the paper sheet having such a sticking-out portion exist in a lower portion of the paper sheet bundle P, part of the sticking-out portion may enter the gap L1. As illustrated in FIG. 1, a gap L2 and a gap L3 may also exist between the standing piece 12*a* and the groove 22*a*. The gap L2 extends in an orthogonal direction (hereinafter, "horizontal direction") orthogonal to the stacking direction of the paper sheets, and the gap L3 extends in the stacking direction. The paper sheets may also enter the gap L2 or L3.

Paper sheets located at the lower portion receive the weight of paper sheets located thereon. Accordingly, unlike paper sheets located at an upper portion of the paper sheet bundle P, the paper sheets located at the lower portion tend to have a stronger force for maintaining an original state thereof. For this reason, a sticking-out portion of the paper sheets located at the lower portion more easily enters any of the gaps L1 to L3 (hereinafter, collectively referred to as "gap L").

The paper sheet that has partially entered the gap (space) L is stacked in an inappropriate state, and thus needs to be brought into a more appropriate state. Unfortunately, the placement of the paper sheet that has partially entered the gap L is less likely to be improved into a more appropriate state during the conveyance. This is because frictions are caused between the respective members of the push-out plates 12 and the lower wall 22 that define the gap L. When the carrier 10 is moved back after the conveyance, these frictions may bring the paper sheet that has partially entered the gap L, into a worse state (less aligned state).

The paper sheets not being aligned may cause not only a paper jam but also damage of the paper sheets in some cases. In view of the above, assuming that all paper sheets to be conveyed are not appropriately aligned, it is important to suppress a portion of the paper sheets not being aligned from entering the gap L between the members that come into contact with the paper sheet bundle.

Patent Document 1: Japanese Patent Laid-Open No. 2005-255407

Patent Document 2: Japanese Utility Model Laid-Open No. 07-965

Patent Document 3: Japanese Patent Laid-Open No. 09-151009

Patent Document 4: Japanese Patent Laid-Open No. 07-172710

SUMMARY

According to a configuration to which the present invention is applied, a carrier includes one or more contact members that come into contact with a paper sheet bundle in which one or more paper sheets are stacked, to push the paper sheet bundle, and the paper sheet bundle is conveyed by the carrier along a conveying path. Suppressing unit that suppresses the paper sheet constituting the paper sheet bundle from passing through a gap existing between a constituent member and the contact members to enter on an inner side of the carrier, the constituent member forming a space of the conveying path, the paper sheet bundle pushed by the carrier coming into contact with the constituent member.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The preferred embodiments of the present invention will be explained in detail below with reference to the drawings.

Figure 1:
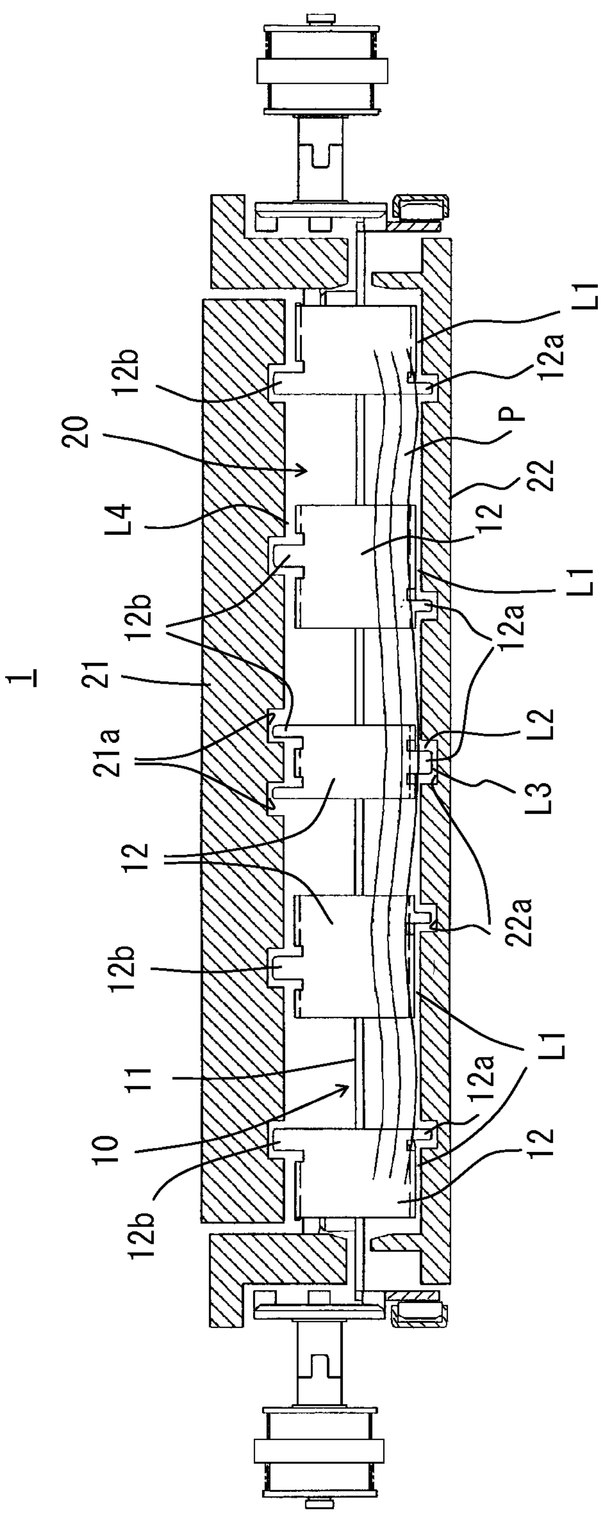
RELATED ART F I G. 1
FIG. 1 is a view for describing a conventional sheet bundle conveying apparatus described in Patent Document 1.
Figure 2:
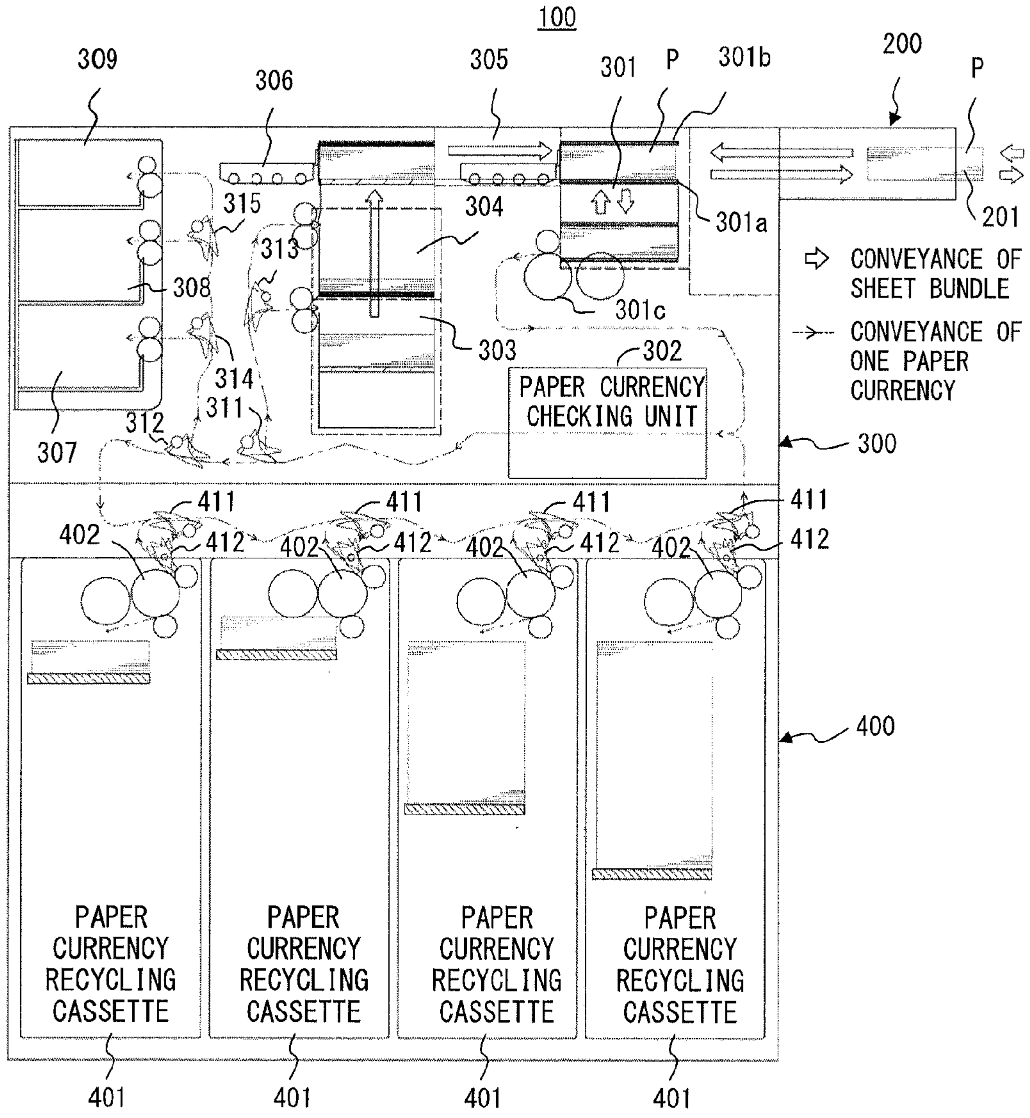
FIG. 2 is a schematic cross-sectional view illustrating an automatic teller machine (ATM) with a sheet bundle conveying apparatus mounted thereon according to the present embodiment.

FIG. 2 is a schematic cross-sectional view illustrating an automatic teller machine (ATM) with a sheet bundle conveying apparatus mounted thereon according to the present embodiment. A paper sheet handling apparatus according to the present embodiment, on which the sheet bundle conveying apparatus is mounted, is implemented as an ATM 100 that handles paper currencies as paper sheets.

As illustrated in FIG. 2, the ATM 100 includes: a money deposit/withdrawal apparatus 200 that receives or delivers one or more paper currencies stacked into a paper currency bundle P; an upper apparatus 300 that delivers the paper currency bundle P between the money deposit/withdrawal apparatus 200; and a lower apparatus 400 that houses the received or deliverable paper currencies.

The money deposit/withdrawal apparatus 200 conveys the paper currency bundle P inserted by a customer from a money deposit/withdrawal port 201, while maintaining the state of the paper currency bundle P when being inserted, to the upper apparatus 300. The money deposit/withdrawal apparatus 200 receives the paper currency bundle P to be delivered or returned from the upper apparatus 300, and conveys received paper currency bundle P to the money deposit/withdrawal port 201. Hereinafter, configurations and behaviors are described mainly assuming the case where the customer deposits money.

The paper currency bundle P from the money deposit/withdrawal apparatus 200 is conveyed to a feeding unit 301 of the upper apparatus 300. More specifically, the paper currency bundle P is conveyed to a lifting stage 301*a* of the feeding unit 301. The lifting stage 301*a* is movable in the up-down direction, and is moved downward after the paper currency bundle P is conveyed thereto. As a result, the paper currencies constituting the paper currency bundle P are fed and conveyed one by one by a feeding mechanism 301*c* provided below the feeding unit 301. A pusher 301*b* provided above the lifting stage 301*a* serves to apply an appropriate pressure to the paper currency bundle P on the lifting stage 301*a*. The pusher 301*b* is movable in the up-down direction so as to enable such pressure application.

Each paper currency fed from the feeding unit 301 is checked by a paper currency checking unit 302. In this checking, whether or not the paper currency is a genuine banknote is determined, and the money type of the genuine banknote is identified. A counterfeit paper currency, an unidentifiable paper currency, or a damaged paper currency is determined as an abnormal banknote.

The upper apparatus 300 is provided with three reject boxes 307 to 309. The upper apparatus 300 is provided with an escrow unit 303 and a reservoir unit 304 for temporarily housing the paper currencies inserted by the customer. A paper currency determined as a genuine banknote by the checking is conveyed to the escrow unit 303 using switching nails 311 and 313, and a paper currency determined as an abnormal banknote is conveyed to the reservoir unit 304 using the switching nails 311 and 313.

The escrow unit 303 and the reservoir unit 304 are each provided with a stage movable in the up-down direction. After the stage is lifted, the paper currencies (paper currency bundle P) housed in each of the escrow unit 303 and the reservoir unit 304 are conveyed to the feeding unit 301 or the money deposit/withdrawal apparatus 200 through a conveying path 305 by a sheet bundle conveying apparatus 306. At the time of depositing money, the paper currencies are conveyed to the feeding unit 301 if the customer gives, at the end, an instruction to deposit the money, and are conveyed to the money deposit/withdrawal apparatus 200 if the customer gives an instruction to cancel the operation. The present embodiment is implemented as the sheet bundle conveying apparatus 306.

The paper currencies in the paper currency bundle P conveyed to the feeding unit 301 are fed one by one to be checked again similarly to the above. A paper currency determined as an abnormal banknote by the checking is conveyed and housed into any of the reject boxes 307 to 309 using switching nails 312, 314, and 315. A paper currency determined as a genuine banknote is conveyed to the lower apparatus 400.

Four paper currency recycling cassettes 401 are mounted on the lower apparatus 400 in order to house the paper currencies on money type basis. Each cassette 401 is provided with a feeding/conveying mechanism 402 for feeding the paper currencies one by one and housing the same inside of the cassette 401. In addition, two switching nails 411 and 412 are provided in the conveying path for each cassette 401. With this configuration, each paper currency is conveyed and housed into the cassette 401 corresponding to the money type identified by the checking.

Figure 3:
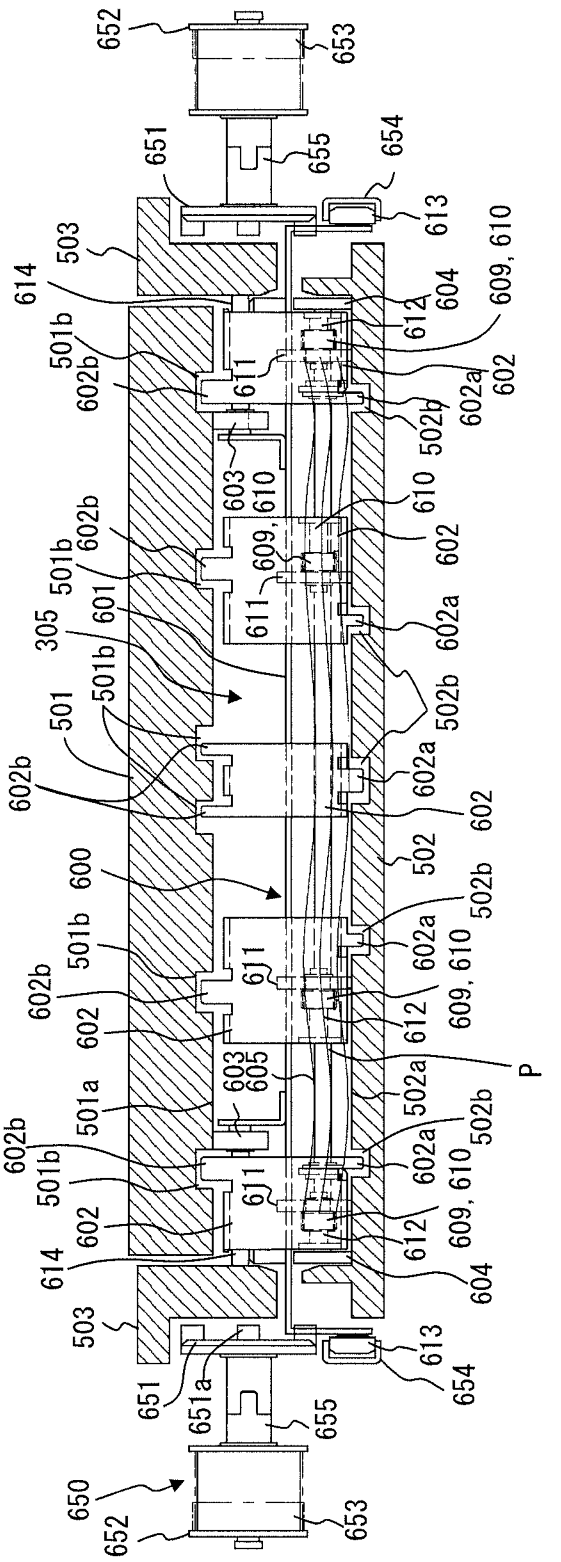
FIG. 3 is a front view illustrating the sheet bundle conveying apparatus according to the present embodiment.
Figure 4:
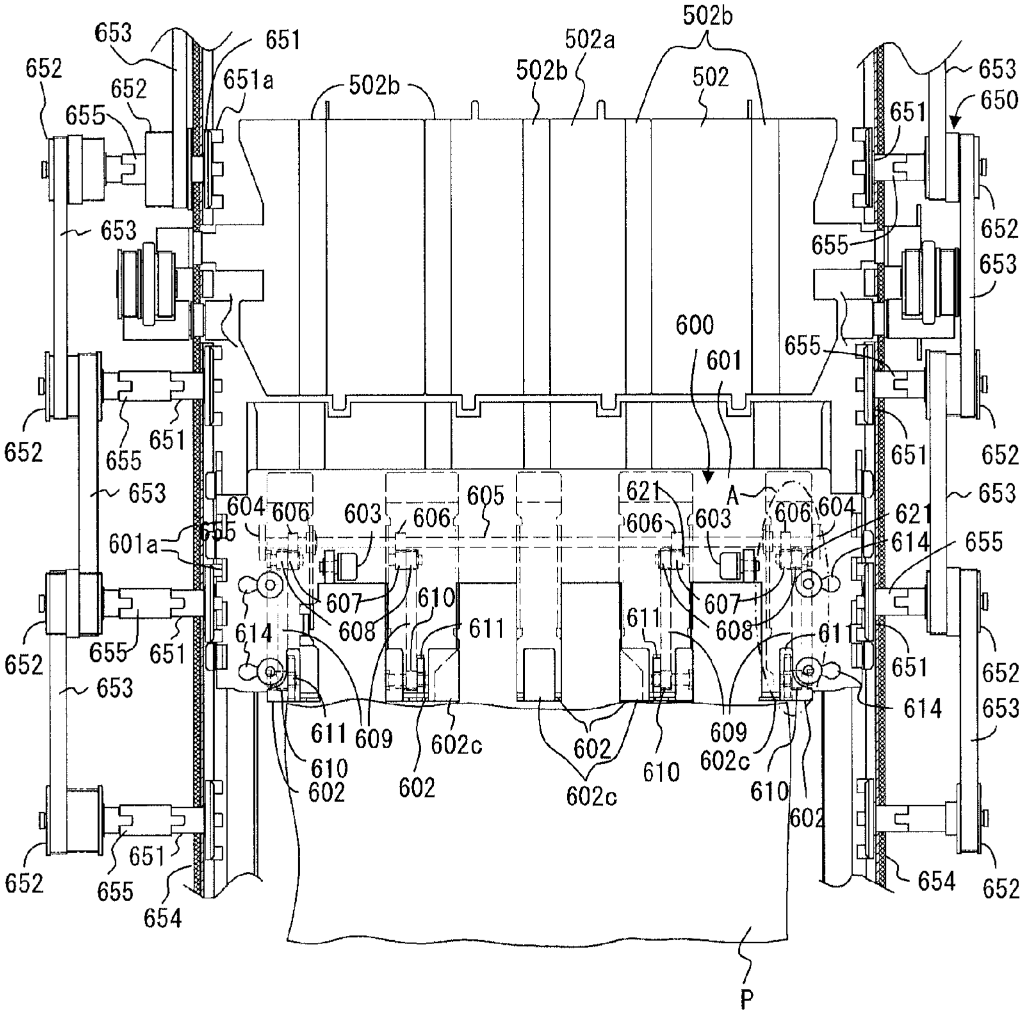
FIG. 4 is a plan view illustrating the sheet bundle conveying apparatus according to the present embodiment.

FIG. 3 is a front view illustrating the sheet bundle conveying apparatus 306, and FIG. 4 is a plan view illustrating the sheet bundle conveying apparatus 306. The front view is taken from the side of the paper currency bundle P conveyed by the sheet bundle conveying apparatus 306, and the plan view is taken from above. Next, the sheet bundle conveying apparatus 306 according to the present embodiment is described in detail with reference to FIG. 3 and FIG. 4. The sheet bundle conveying apparatus 306 is configured basically by applying the present invention to the conventional sheet bundle conveying apparatus described in Patent Document 1.

As illustrated in FIG. 3, the conveying path 305 is a space having a shape defined by an upper wall 501, a lower wall 502, and two side walls 503 that are separate members independent of each other, the side walls 503 being located on both sides of the upper wall 501. The sheet bundle conveying apparatus 306 is formed of roughly two parts, that is, a carrier 600 moved along the conveying path 305 and a driving system 650 that drives the carrier 600. In FIG. 3 and FIG. 4, numbers equal to or larger than 601 and smaller than 650 are given as reference signs to components of the carrier 600, and numbers equal to or larger than 651 are given as reference signs to components of the driving system 650.

In a configuration of the carrier 600, fives push-out plates 602 that come into contact with the paper currency bundle P when being conveyed are provided on an opposed side of a plate-like member 601 to the paper currency bundle P, the plate-like member 601 being produced by bending a metal plate punched into a predetermined shape. Hereinafter, for convenience, a contact side of each push-out plate 602 with the paper currency bundle P is referred to as a "front side", and the opposite side thereof is referred to as a "back side". The direction toward the front side is referred to as a "front-side direction" (or a "push-out direction"), and the opposite direction is referred to as a "back-side direction".

Each push-out plate 602 is provided with a standing piece 602*a* protruding toward the lower wall 502 and a standing piece 602*b* protruding toward the upper wall 501. Accordingly, a groove 502*b* having a shape suited to that of each standing piece 602*a* is formed on a surface 502*a* of the lower wall 502 in accordance with a position of each standing piece 602*a*, and a groove 501*b* having a shape suited to that of each standing piece 602*b* is formed on a surface 501*a* of the upper wall 501 in accordance with a position of each standing piece 602*b*. 602*c* denotes a folded-back piece obtained by bending an upper portion of the metal plate forming the push-out plate 602. Such a folded-back piece exists also in a lower portion thereof.

Both ends of the plate-like member 601 are bent, and a roller 613 is attached to each of the ends. Rails 654 having a U-shape in cross-section are attached along the conveying path 305 in parallel with the conveying direction of the paper currency bundle P. The roller 613 is inserted into each rail 654. With this configuration, the use of the rails 654 suppresses unsteadiness, and the carrier 600 can be moved more smoothly.

Rollers 603 that come into contact with the surface 501*a* of the upper wall 501 are attached to the plate-like member 601. The rollers 603 are provided also in order to enable more smooth movement of the carrier 600.

In addition, totally four elastic members 614 that come into contact with the side walls 503 are attached to the plate-like member 601. The elastic members 614 serve to suppress the carrier 600 from moving in a direction in which the two side walls 503 face each other.

A plurality of cut-out parts 601*a* are provided at both the ends of the plate-like member 601. The cut-out parts 601*a* are provided in order to transmit power by means of bosses 651*a* protruding from each driving roller 651.

One or two pulleys 652 are attached to a shaft 655 coupled to each driving roller 651. A timing belt 653 is provided in a tense state between the pulleys 652 adjacent in the conveying direction. With this configuration, power from a power source (for example, stepping motor), which is not particularly illustrated, is transmitted to each driving roller 651 via the timing belt. The driving roller 651 is rotated by the power thus transmitted, and this rotation causes a change in position of the bosses 651*a* of the driving roller 651. Then, the power is transmitted to the carrier 600 along with this change in position, so that the carrier 600 is moved. During the movement of the carrier 600, the bosses 651*a* alternately repeat entrance into and exit from the cut-out parts 601*a*. The power is transmitted via the bosses 651*a* during a period between the entrance into and the exit from the cut-out parts 601*a*.

Figure 5:
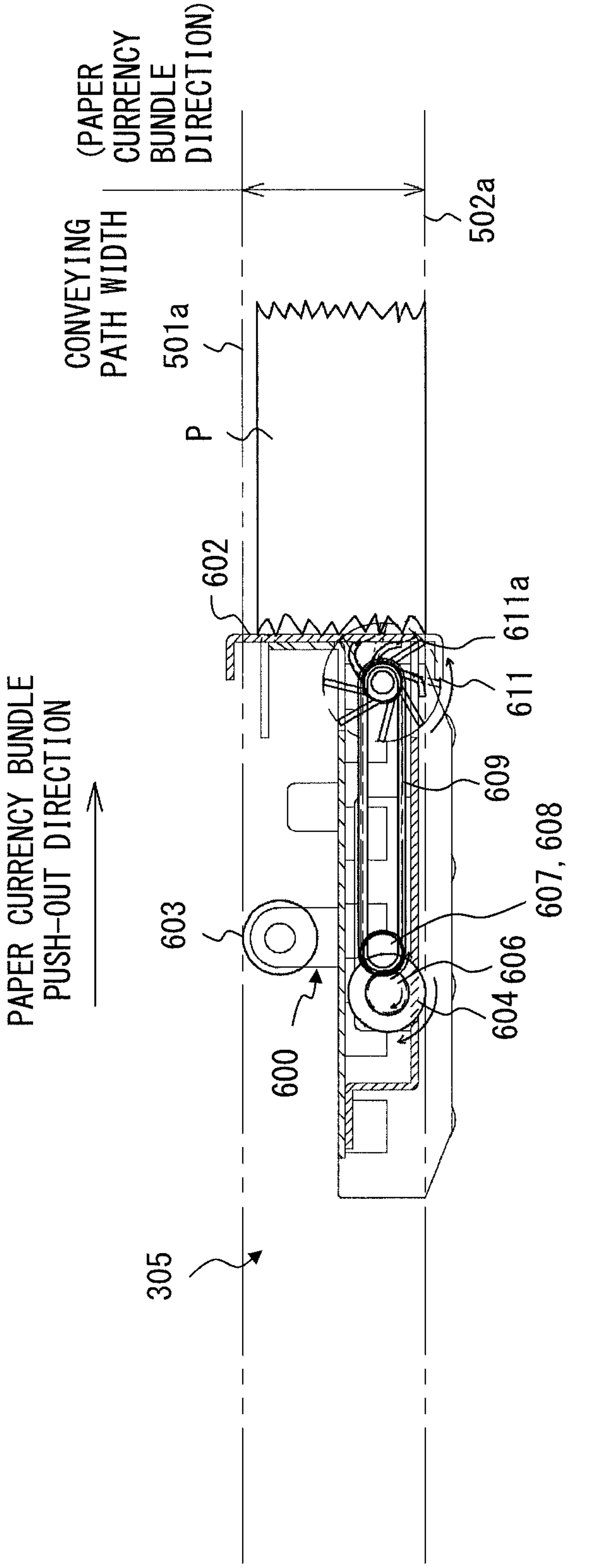
FIG. 5 is a view for describing a behavior of an impeller at the time of conveying a paper currency bundle.

The configuration of the above-mentioned part is basically the same as that of the conventional sheet bundle conveying apparatus described in Patent Document 1. In this configuration, as illustrated in FIG. 3, a gap (space) exists between a lower end of each push-out plate 602 and the surface 502*a* of the lower wall 502, and a gap (space) exists also between each cut-out piece 602*a* and each groove 502*b*. The paper currency is thin and flexible, and thus can enter any gap. The carrier 600 is used not only for conveying the paper currency bundle P along the conveying path 305 but also for appropriately positioning the paper currency bundle P conveyed from the input/output apparatus 200, in the feeding unit 301. From this fact, particularly when the paper currency bundle P is conveyed (the carrier 600 is moved in the front-side direction) and when the conveyed paper currency bundle P comes into contact, part of paper currency sticking out of the paper currency bundle P toward the carrier 600 may enter the gaps. In the present embodiment, the following configuration suppresses the paper currency from entering the gaps. Specific description thereof is given with additional reference to FIG. 5. FIG. 5 is a view for describing a behavior of an impeller 611 at the time of conveying the paper currency bundle P.

As illustrated in FIG. 3 to FIG. 5, the impeller 611 is provided on a rear side of each of the push-out plates 602 other than the push-out plate 602 located at the center. The impeller 611 is configured as a structure in which a plurality of elastic members 611*a* protruding along the radial direction are provided at a given interval in the circumferential direction, and the impeller 611 is rotatably supported so that the elastic member 611*a* located at a lower portion comes into contact with the surface 502*a* of the lower wall 502. With this configuration, as illustrated in FIG. 5, the elastic member (hereinafter, referred to as "first elastic member" for convenience) 611*a* that has a leading end in contact with the surface 502*a* and is located closest to the push-out plate 602 fills the gap between the push-out plate 602 and the surface 502*a*. The elastic member (hereinafter, referred to as "second elastic member" for convenience) 611*a* that is located on the back side of the first elastic member 611*a* deforms to a larger degree, and has a leading end in contact with the surface 502*a*.

The first and second elastic members 611*a* both serve as resistance (barrier) to an invasion of part of the paper currencies from the gap. The first elastic member 611*a* suppresses the paper currency from invading on the rear side of the push-out plate 602 from the gap, and the second elastic member 611*a* suppresses the paper currency that have entered from the gap from invading a deeper portion. Accordingly, the impeller 611 can suppress the paper currency from entering from the gap, without being rotated. This means that the conveyed paper currency bundle P can be positioned more appropriately in the feeding unit 301, that is, the paper currency bundle P in a more aligned state can be blocked with a higher accuracy.

When the impeller 611 is rotated in an arrow direction illustrated in FIG. 5, the paper currency that has entered from the gap is sandwiched between the second elastic member 611*a* and the surface 502*a*, and the second elastic member 611*a* applies a force in the push-out direction from the gap using a frictional force. Accordingly, the paper currency that has entered from the gap can be put at a more appropriate position, that is, can be more aligned with other paper currencies.

A force corresponding to the number (weight) of the paper currencies in the paper currency bundle P is applied to the paper currency that has entered from the gap. This force hinders the paper currency to which the second elastic member 611*a* applies the frictional force, from returning to the appropriate position. From this, the force that is applied by the other paper currencies to the paper currency to which the frictional force is applied may be reduced. This can be achieved, for example, in the following manner. Another impeller is provided at a portion that comes into contact with the paper currency bundle P, and the impeller is rotated in the same direction as the arrow illustrated in FIG. 5, whereby a force in a lifting direction is applied to especially a lower portion of the paper currency bundle P. If such a force is applied, paper currencies not being aligned among the paper currencies that have not entered from the gap can be more appropriately aligned along a surface of the push-out plate 602 during the conveyance.

As illustrated in FIG. 3 to FIG. 5, in the present embodiment, two rollers 604 that come into contact with the surface 502*a* are provided to the carrier 600. The rollers 604 serve as a power source for rotating the impeller 611. The reason why the power source is provided to the carrier 600 in this manner is to suppress the configuration from being complicated by transmitting the power for rotating the impeller 611 from the outside.

The two rollers 604 are respectively attached to both ends of a shaft 605. Gears 606 are attached to the shaft 605. With this configuration, the gears 606 are rotated by rotation of the rollers 604 in the same direction, and this rotation is transmitted to gears 607 respectively meshed with the gears 606.

Pulleys 608 are attached to a shaft 621 to which the gears 607 are attached. Similarly to the impellers 611, pulleys 610 are attached to a shaft 612, and a timing belt 609 is provided in a tense state between each pulley 608 and each pulley 610. With this configuration, as illustrated in FIG. 5, when the carrier 600 is moving in the front-side direction (expressed by "PAPER CURRENCY BUNDLE PUSH-OUT DIRECTION" in FIG. 5) in order to convey the paper currency bundle P, each roller 604 and each impeller 611 are rotated in the opposite direction. That is, when the carrier 600 is moving in the front-side direction, the impeller 611 is rotated in the arrow direction illustrated in FIG. 5. As a result, when the carrier 600 is moving in the front-side direction, a force for pushing out, from the gap, the paper currency that has entered from the gap between the push-out plate 602 and the surface 502*a* (in this case, including a gap between the standing piece 602*a* and the groove 502*b*) is transmitted via the impeller 611.

The above-mentioned configuration is adopted for a driving system of the impellers 611, that is, a unit (transmitting means) that rotates the impellers 611 using the rollers 604 as the power source. With the driving system as described above, however, when the carrier 600 is moved in the back-side direction, each impeller 611 is rotated in the opposite direction to the arrow direction illustrated in FIG. 5. This rotation is not desirable because a force is applied to the paper currency that has entered from the gap, in a direction in which the paper currencies enter a deeper portion.

The rotation in the opposite direction can be avoided by, for example, adopting a one-way clutch structure in which the gears 607 are rotated in only one direction. In addition, in the case where a configuration of a part A in FIG. 4 is modified to that as illustrated in FIG. 6, even when the carrier 600 is moved in the back-side direction, the impeller 611 can be rotated in the arrow direction illustrated in FIG. 5.

Figure 6:
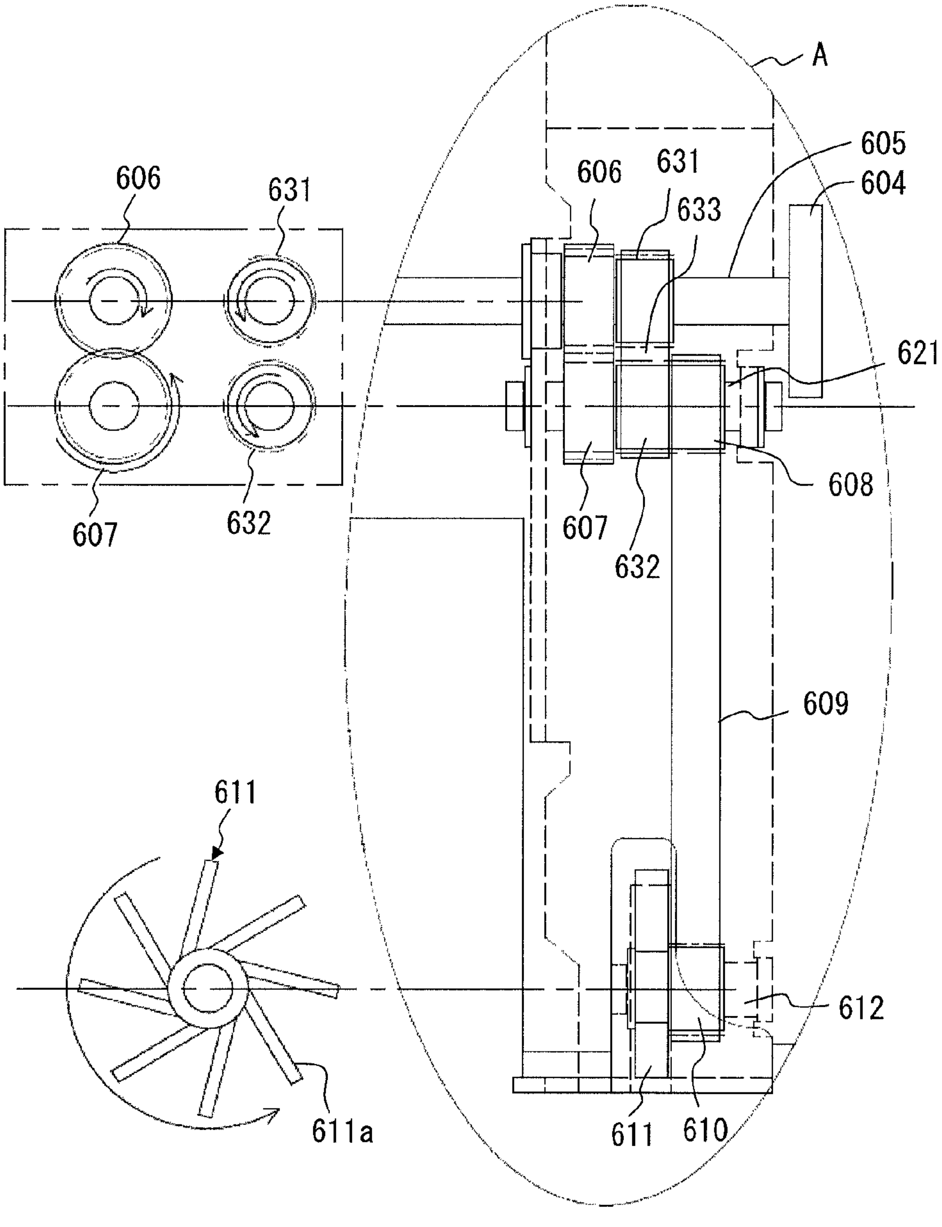
FIG. 6 is a view for describing a modified example of a configuration of a part A in FIG. 4.

In a configuration illustrated in FIG. 6, pulleys 631 and 632 are further attached to shafts 605 and 621, respectively, and a timing belt 633 is provided in a tense state between the pulleys 631 and 632. The one-way clutch structure is adopted for, for example, the pulley 632 in addition to the gear 607. With this configuration, the gear 607 and the pulley 632 are rotated in only arrow directions respectively illustrated in FIG. 6. As a result, when the carrier 600 is moved in the front-side direction, the power transmission via the gear 607 is effective, and when the carrier 600 is moved in the back-side direction, the power transmission via the pulley 632 is effective. Accordingly, the impeller 611 is rotated always in only an arrow direction illustrated in FIG. 6 irrespective of the moving direction of the carrier 600. With this configuration, even after the conveyance, a force can be applied in the push-out direction to the paper currency that has entered from the gap.

Note that, in the present embodiment, the rollers 604 that are rotated along with the movement of the carrier 600 are used as the power source for the impellers 611, but a motor or the like may be used as the power source. In addition, the impellers 611 are used for two purposes of: suppressing the paper currency from invading from the gap; and eliminating the paper currency that has invaded from the gap, but may be used for, for example, only the latter purpose. The invasion of the paper currency from the gap may be suppressed by providing an elastic member so as to block the gap. Accordingly, a component (member) used for suppressing the paper currency from entering from the gap is not limited to the impeller. In this way, various modifications are possible. In addition, the configuration of the carrier 600 including the push-out plates 602 is not limited to the present embodiment. The paper sheet handling apparatus is not limited to an apparatus that handles paper currencies, such as the ATM.

In the present embodiment, the elastic members 611*a* of each impeller 611 come into contact with the paper currency that has entered from the gap (space) generated between the lower end of each push-out plate 612 and the surface 502*a* of the lower wall 502, and apply the frictional force to the paper currency. Because the gap is extremely small, the elastic members 611*a* come into contact with a portion of the paper currency in most cases, the portion having passed through the gap from the paper currency bundle P and entered on a deeper side of the push-out plate 612 (an inner side of the carrier 600). Owing to the gap, the frictional force applied by the elastic members 611*a* to the paper currency acts so as to push out the paper currency toward the paper currency bundle P.

If the number of the paper currencies constituting the paper currency bundle P is relatively small, the paper currency to which this frictional force is applied can be expected to change to a more appropriate state. If the number thereof is large, however, the paper currency to which the elastic members 611*a* apply the frictional force cannot be expected too much to change to a more appropriate state, due to a frictional force generated between the paper currencies. Accordingly, the following modification may be made. Another embodiment in which the modification is made is specifically described with reference to FIG. 7 and FIG. 8.

Figure 7:
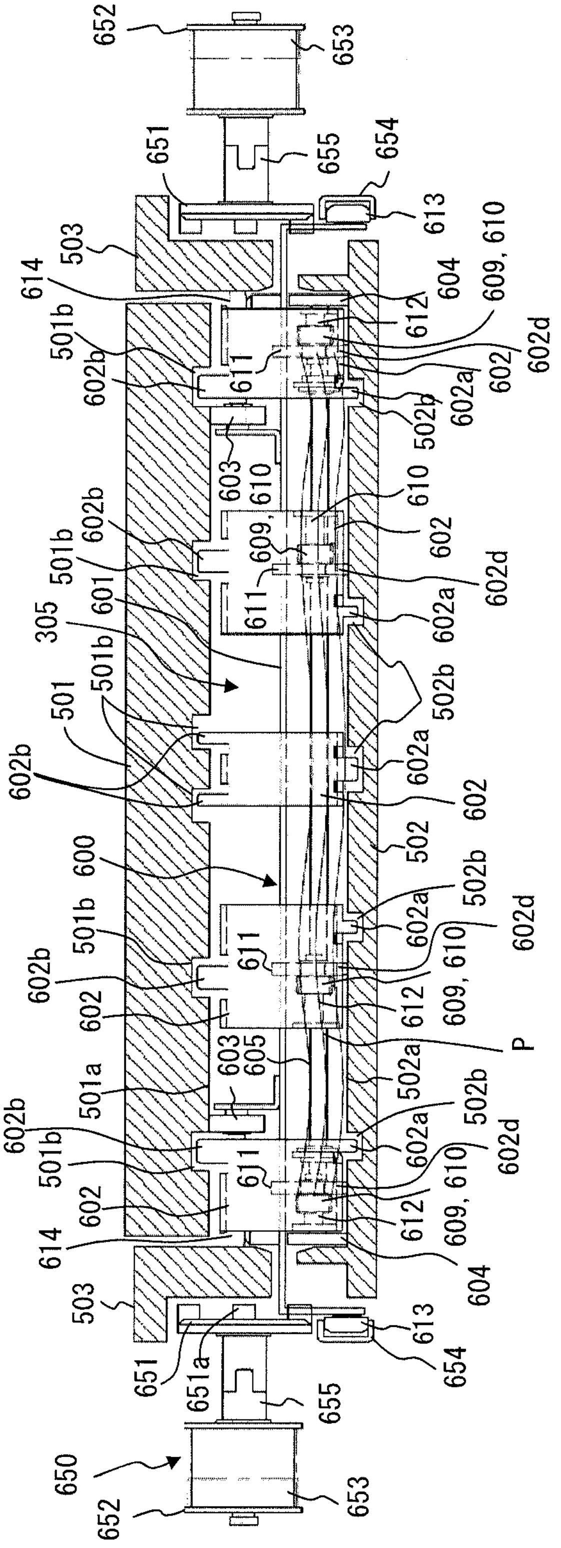
FIG. 7 is a front view illustrating a sheet bundle conveying apparatus according to another embodiment.
Figure 8:
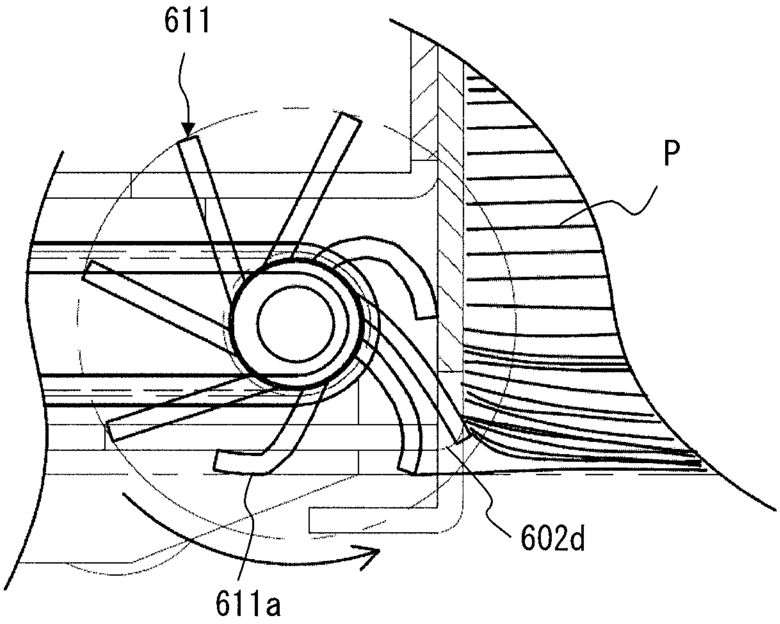
FIG. 8 is a view for describing a behavior of an impeller according to the another embodiment.

FIG. 7 is a front view illustrating a sheet bundle conveying apparatus according to the another embodiment, and FIG. 8 is a view for describing a behavior of an impeller according to the another embodiment. Here, only a modified part according to the another embodiment is described with reference to FIG. 7 and FIG. 8. From this, component that is the same or basically the same as the above-mentioned embodiment is denoted the same reference sign.

As illustrated in FIG. 7, in the another embodiment, a cut-out part 602*d* that is an opening is provided in a lower portion of each push-out plate 612. The cut-out part 602*d* is provided in a portion opposed to each impeller 611. With this configuration, the leading ends of the elastic members 611*a* enter the cut-out part 602*a* during rotation of the impeller 611.

The cut-out part 602*d* enables the elastic members 611*a* to be in contact with the paper currency bundle P for a longer time in a longer distance range than the gap generated between the lower end of each push-out plate 612 and the surface 502*a* of the lower wall 502. Because the elastic members 611*a* can be in contact in the longer distance range, as illustrated in FIG. 8, the elastic members 611*a* not only apply the frictional force to the paper currency in the push-out direction toward the paper currency bundle P, but also apply a force in a direction in which the paper currency bundle P is lifted upward. The force in the lifting direction reduces frictional forces generated between the paper currency that has entered the gap and the paper currencies in contact therewith. Accordingly, the paper currency to which the elastic members 611*a* apply the frictional force can be more reliably brought into an appropriate state.

The force in the direction in which the paper currency bundle P is lifted upward can also be applied by providing a groove like the groove 502*b* in the lower wall 502, instead of providing the cut-out part 602*d* in the push-out plate 612. Such a groove or the cut-out part 602*d* does not necessarily need to be provided in all the impellers 611. That is, both of the impellers 611 provided with the groove or the cut-out part 602*d* and the impellers 611 not provided therewith may exist. In the case where both types of the impellers 611 exist, it is desirable to decide a shape, arrangement, and the like for each impeller 611 depending on whether or not the impeller 611 is provided with the groove or the cut-out part 602*d*.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A sheet bundle conveying apparatus that conveys a paper sheet bundle in which one or more paper sheets are stacked, along a conveying path, comprising:

a carrier including one or more push-out plates that come into contact with the paper sheet bundle to push the paper sheet bundle, the carrier being moved along the conveying path;

an impeller that suppresses the paper sheet included in the paper sheet bundle from entering a gap existing between a lower wall or an upper wall of the conveying path and one of the push-out plates, the lower wall or the upper wall of the conveying path contacted with the paper sheet bundle pushed by the carrier; and a power source that rotates the impeller, wherein the impeller includes a plurality of elastic members each of which has an elastic force and which protrude along a radial direction and are provided at a given interval in a circumferential direction; and the impeller suppresses, when the carrier is stopped, the paper sheet from entering the gap, by means of the impeller with the elastic members being in contact with the lower wall or the upper wall of the conveying path, and the impeller suppresses, when the carrier is moved, the paper sheets from entering the gap, by causing the power source to rotate the impeller and applying a push-out force to the paper sheet via the elastic members coming into contact with portions of the paper sheet, the portions each having entered the gap.

2. The sheet bundle conveying apparatus according to claim 1, wherein the push-out plates have a cut-out part, and the impeller suppresses the paper sheet from entering the gap, by means of the elastic members coming into contact with the paper sheets through the cut-out part.

3. The sheet bundle conveying apparatus according to claim 1, wherein the power source includes:

a rotatable roller that comes into contact with a member existing on the conveying path; and a gear and a pulley that transmit, to the impeller, rotation of the roller caused by the movement of the carrier.

4. The sheet bundle conveying apparatus according to claim 3, wherein the power source rotates the impeller always in the same direction, when the carrier is moved.

5. A paper sheet handling apparatus comprising:

the sheet bundle conveying apparatus according to claim 1; and a lifting stage that lifts while retaining paper sheets of the sheet bundle in a bundled state.

* * * * *